United States Patent
Lindsay

(10) Patent No.: US 8,229,303 B1
(45) Date of Patent: Jul. 24, 2012

(54) REDUCING PULSE NARROWING IN THE TRANSMITTER SIGNAL THAT DRIVES A LIMITING E/O CONVERTER FOR OPTICAL FIBER CHANNELS

(75) Inventor: Thomas A. Lindsay, Brier, WA (US)

(73) Assignee: ClariPhy Communications, Inc., Irvine, CA (US)

( * ) Notice: Subject to any disclaimer, the term of this patent is extended or adjusted under 35 U.S.C. 154(b) by 976 days.

(21) Appl. No.: 11/835,418

(22) Filed: Aug. 7, 2007

Related U.S. Application Data

(60) Provisional application No. 60/836,295, filed on Aug. 7, 2006.

(51) Int. Cl.
*H04B 10/04* (2006.01)

(52) U.S. Cl. ........ 398/193; 398/182; 398/183; 398/194; 398/192; 398/158; 398/159; 398/135; 398/136

(58) Field of Classification Search ............... 398/182, 398/183, 185, 186, 187, 188, 189, 192, 193, 398/194, 195, 196, 197, 198, 200, 201, 158, 398/159, 81, 25, 26, 27, 9, 135, 136, 138, 398/139, 128, 130, 16, 17, 22, 23, 140, 141
See application file for complete search history.

(56) References Cited

U.S. PATENT DOCUMENTS

| | | | | | |
|---|---|---|---|---|---|
| 4,989,212 | A | * | 1/1991 | Mecherle | 372/26 |
| 7,277,477 | B1 | * | 10/2007 | Ahmad | 375/220 |
| 7,302,192 | B2 | * | 11/2007 | Elahmadi et al. | 398/190 |
| 7,382,984 | B2 | * | 6/2008 | McNicol et al. | 398/147 |
| 7,672,599 | B2 | * | 3/2010 | Essiambre et al. | 398/193 |
| 7,693,691 | B1 | * | 4/2010 | Tao et al. | 703/2 |
| 2004/0013184 | A1 | * | 1/2004 | Tonietto et al. | 375/220 |
| 2005/0238368 | A1 | * | 10/2005 | Ikeuchi et al. | 398/198 |
| 2005/0281355 | A1 | * | 12/2005 | Cranford et al. | 375/316 |
| 2006/0127104 | A1 | * | 6/2006 | Harley et al. | 398/198 |
| 2007/0031153 | A1 | * | 2/2007 | Aronson et al. | 398/138 |
| 2008/0226301 | A1 | * | 9/2008 | Alic et al. | 398/158 |

* cited by examiner

*Primary Examiner* — Hanh Phan
(74) *Attorney, Agent, or Firm* — Fenwick & West LLP

(57) ABSTRACT

A transmitter reduces or minimizes pulse narrowing. In one approach, an optical transmitter is designed to transmit data over an optical fiber at a specified data rate using on-off keying. The transmitter includes a pre-converter electrical channel and a limiting E/O converter. The pre-converter electrical channel produces a pre-converter signal that drives the limiting E/O converter. The pre-converter electrical channel is designed to reduce pulse narrowing in the pre-converter signal. In one implementation, the pre-converter electrical channel includes a pre-emphasis filter that is designed to minimize pulse width shrinkage.

28 Claims, 11 Drawing Sheets

REDUCING PULSE NARROWING IN THE TRANSMITTER SIGNAL THAT DRIVES A LIMITING E/O CONVERTER FOR OPTICAL FIBER CHANNELS

CROSS-REFERENCE TO RELATED APPLICATION(S)

This application claims priority under 35 U.S.C. §119(e) to U.S. Provisional Patent Application Ser. No. 60/836,295, "Improvement of Rx/EQ SNR by Overcompensation of the Tx Electrical Channel," filed Aug. 7, 2006. The subject matter of all of the foregoing is incorporated herein by reference in its entirety.

BACKGROUND OF THE INVENTION

1. Field of the Invention

This invention relates generally to the transmission of data over optical fibers and, more particularly, to reducing the amount of pulse narrowing in the electrical signal that drives a limiting E/O converter in the transmitter in order to improve the performance of the transmission.

2. Description of the Related Art

Optical fiber is widely used as a communications medium in high speed digital networks, including local area networks (LANs), storage area networks (SANs), and wide area networks (WANs). There has been a trend in optical networking towards ever-increasing data rates. While 100 Mbps was once considered extremely fast for enterprise networking, attention has recently shifted to 10 Gbps, 100 times faster. As used in this disclosure, 10 Gigabit (abbreviated as 10G or 10 Gbps) systems are understood to include optical fiber communication systems that have data rates or line rates (i.e., bit rates including overhead) of approximately 10 Gigabits per second.

Regardless of the specific data rate, application or architecture, communications links (including optical fiber communications links) invariably include a transmitter, a channel and a receiver. In an optical fiber communications link, the transmitter typically converts the digital data to be sent to an optical form suitable for transmission over the channel (i.e., the optical fiber). The optical signal is transported from the transmitter to the receiver over the channel, possibly suffering channel impairments along the way, and the receiver then recovers the digital data from the received optical signal.

In an optical fiber communications system, the optical power output by a laser is commonly modulated in a binary fashion to send data over an optical fiber. Nominally, the optical power is high for the duration of a bit period to send a logical "1," and low to send a logical "0." This is commonly referred to as on-off-keying (OOK) and, more specifically, as non-return-to-zero (NRZ) on-off-keying, where "on" means high laser power and "off" means low laser power. When on-off keying is used, the transmitter usually includes a laser driver that acts as a limiter, clipping (i.e., limiting) the electrical signal driving the laser, in accordance with the on-off mode of operation of the laser. The transmitter may also include circuitry that conditions the signal entering the limiter. Conventional wisdom is that this circuitry should be optimized to minimize the data-dependent jitter DDJ (i.e., maximize the horizontal eye opening or horizontal eye width) of the optical signal output by the laser. Furthermore, conventional wisdom suggests that in many cases this is best achieved by minimizing DDJ of the electrical signal entering the limiter.

However, as shown below, metrics other than DDJ may be just as important, or even more important, in designing transmitters.

SUMMARY OF THE INVENTION

The present invention overcomes the limitations of the prior art by providing a transmitter that reduces or minimizes pulse narrowing. This can be done in place of or in conjunction with reducing and/or minimizing data-dependent jitter. Assume that an ideal 1-bit pulse (for example, a single "1" bit preceded and followed by "0" bits) has a width of one unit interval (1 UI). Actual pulses can be narrower or wider than this. Pulse narrowing describes the case where a pulse is narrowed relative to the ideal width. Different metrics can be used to characterize the pulse narrowing for a transmitter. "Pulse reduction" is one metric for individual pulses and is defined as the ideal pulse width minus the actual pulse width. For example, if an actual 1-bit pulse has a width of 0.9 UI, it may be characterized by a pulse reduction of 0.1 UI. "Pulse width shrinkage" is a metric for a sequence of pulses (e.g., a test pattern). It is defined as (1 UI—minimum pulse width) where the minimum pulse width is the width of the narrowest pulse in the sequence.

In one aspect of the invention, an optical transmitter is designed to transmit data over an optical fiber at a specified data rate using on-off keying. The transmitter includes a pre-converter dispersive electrical channel and a limiting E/O converter. The pre-converter electrical channel produces a pre-converter signal that drives the limiting E/O converter. The pre-converter electrical channel is designed to reduce and/or minimize pulse narrowing. For example, the pre-converter electrical channel may be designed to reduce and/or minimize pulse width shrinkage.

In another aspect of the invention, the testing of optical transmitters that include a pre-converter electrical channel coupled to a limiting E/O converter is based at least in part on metrics for pulse narrowing. In one approach, a repeating data sequence is applied to the pre-converter electrical channel. A pulse narrowing metric of the resulting pre-converter signal is measured. Averaging may be used to reduce the effects of random or other uncorrelated non-data-dependent artifacts from the measurements. The transmitter is characterized at least in part based on the pulse narrowing metric. For example, the transmitter (or modules or components within the transmitter, particularly those that contain a portion of the pre-converter electrical channel) may fail the test if its pulse width shrinkage is more than a maximum allowable amount. For example, in the case of an SFP+ system, the SFP+ host system (which contains the pre-converter electrical channel) is connected through a connector to the laser driver and laser source. A test based on pulse width shrinkage may be used to pass or reject components in the SFP+ host system. In another aspect, the test may be based on a metric that combines pulse narrowing with other effects, such as DDJ.

In another aspect of the invention, compared to the approach of reducing DDJ, the pre-converter electrical channel is designed so that the pre-converter signal has less pulse narrowing compared to the conventional DDJ-minimizing design. In one implementation, the pre-converter electrical channel includes a pre-emphasis filter. The filter would apply a certain amount of compensation if designed for the DDJ-minimizing case, but it applies more than this amount (it overcompensates) in order to reduce pulse narrowing compared to the DDJ-minimizing case. The limiting E/O converter includes a limiting laser driver and a laser source.

In some cases, a pre-converter electrical channel that reduces pulse narrowing (e.g., by overcompensation) will result in a pre-converter signal that has overshoot when transitioning from one bit level to the other (where the DDJ-minimizing pre-converter signal had none) or that has more overshoot than that of the corresponding DDJ-minimizing pre-converter signal. In one particular design, the pre-converter electrical channel includes a pre-emphasis filter, the pre-emphasis filter is a two-tap FIR (finite impulse response) filter with response (1+g, −g) and the value of g is greater than the value of g that would minimize the data-dependent jitter.

One advantage of this approach is that reducing pulse narrowing (i.e., maintaining wider pulses) at the transmitter can be more important to improving receiver SNR than minimizing DDJ, especially for receivers that do not have a feed-forward equalizer (e.g., receivers with only a DFE or with only a limiter and no equalizer).

Other aspects of the invention include methods corresponding to the devices, and applications for all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
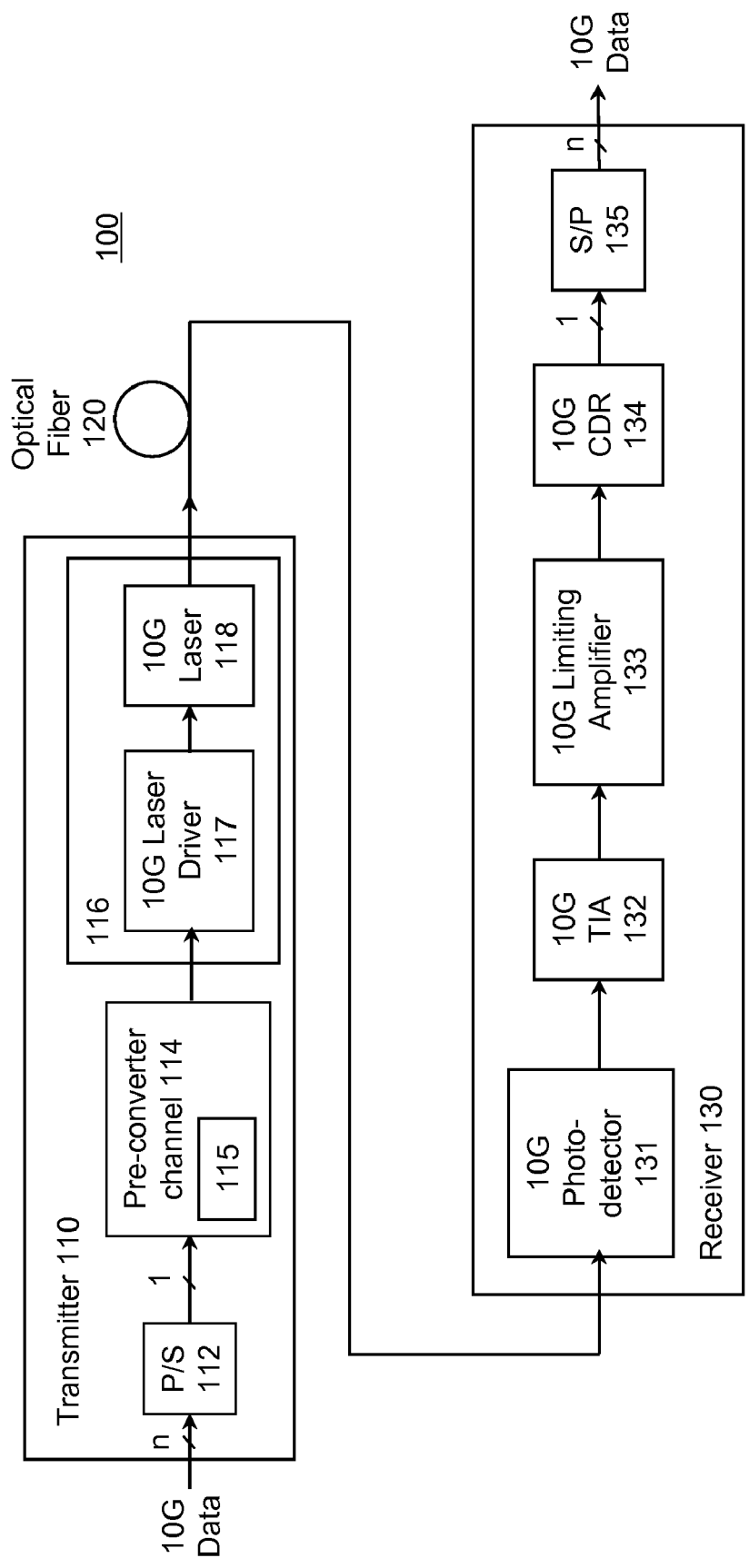
FIG. 1 is a block diagram of an optical fiber communications link according to the present invention.

FIG. 1 is a block diagram of a 10G optical fiber communications link 100 according to the present invention. The link 100 includes a transmitter 110 coupled through optical fiber 120 (the channel) to a receiver 130. A typical transmitter 110 may include a serializer, or parallel/serial converter (P/S), 112 for receiving 10G data from a data source on a plurality of parallel lines and providing serial data to rest of the transmitter. The limiting E/O converter 116 limits the received electrical signal and converts it to an optical form suitable for transmission over fiber 120. The term "pre-converter electrical channel" 114 will be used to refer to components between the data input and the limiting E/O converter 116. The pre-converter electrical channel 114 conditions the signal input to the limiting E/O converter 116. For convenience, this signal will be referred to as the pre-converter signal.

In the specific example of FIG. 1, the pre-converter electrical channel 114 includes a pre-emphasis filter 115. The pre-emphasis filter may be implemented in different ways. For example, it can be implemented in a DSP (integrated) circuit and/or part of P/S 112. Alternately, it can be implemented by a passive network. The limiting E/O converter 116 includes a 10G laser driver 117 coupled to a laser source 118. The laser driver 117 is typically a limiter, which ideally would produce a square wave output that drives the 10G laser 118. The 10G laser 118 launches an OOK-encoded optical signal carrying the data on optical fiber 120.

A typical receiver 130 includes a 10G photodetector 131 for receiving and detecting data from the fiber 130. The detected data is typically processed through a 10G transimpedance amplifier 132, a 10G amplifier 133, and a 10G clock and data recovery unit 134. The data may then be placed on a parallel data interface through a serial/parallel converter (S/P) 135.

Conventional wisdom is that the pre-converter electrical channel 114 should be designed to minimize the data-dependent jitter DDJ (i.e., maximize the horizontal eye opening or width) of the pre-converter signal (i.e., the signal driving the limiting E/O converter 116).

Mathematically, assume a sequence of pulses driving the pre-converter electrical channel 114. This sequence of pulses will generate a pre-converter signal that enters the limiting E/O converter 116. The limiter will clip the incoming pre-converter signal, producing a mostly square wave that has a series of transitions, from 0 to 1 or from 1 to 0. Let $t_n$ be the crossing time for transition n. In many cases, the crossing time will be defined as the time when the waveform crosses a mid or average value of the waveform. Assume that $t_n$ is expressed in terms of unit intervals (UI), which is the basic time period for a 1-bit pulse.

In an ideal conventional system, all crossing times would fall exactly on an integer number of UI and the difference between consecutive crossing times (i.e., the pulse width) would always be 1 UI for 1-bit pulses or an integer number of UI for sequences with multiple 1's or 0's in a row. In actual systems, the crossing times $t_n$ will not always fall on an integer number of UI. The limiting function of the limiting E/O converter 116 converts amplitude and other variations in the pre-converter signal into jitter in the crossing times $t_n$. Let $\Delta t_n$ be the jitter in crossing time $t_n$, which is defined as the deviation from the ideal crossing time. Then, the data-dependent jitter (peak-peak) can be defined as $$\text{DDJ} = \max\{\Delta t_n\} - \min\{\Delta t_n\} \quad (1)$$

where the min and max are taken with respect to all pulses in a repeating data sequence. A related quantity is the data-dependent horizontal eye width, which is inversely proportional to DDJ:

$$\text{horizontal eye width} = 1 \text{ UI} - \text{DDJ}. \quad (2)$$

Minimizing DDJ is equivalent to maximizing the data-dependent horizontal eye width. For convenience, the pre-converter electrical channel that minimizes DDJ (or maximizes horizontal eye width) will be referred to as the DDJ-minimizing pre-converter electrical channel or the conventional pre-converter electrical channel. Similarly, the resulting pre-converter signal will be referred to as the DDJ-minimizing pre-converter signal or the conventional pre-converter signal.

In FIG. 1, the pre-converter electrical channel 114 is designed to reduce and/or minimize pulse narrowing. The pulse width of a pulse can be defined as $$\text{pulse width} = (t_{n+1} - t_n) \quad (3)$$

For a sequence of pulses, the minimum pulse width is defined as $$\text{minimum pulse width} = \min\{\text{pulse width}\} = \min\{(t_{n+1} - t_n)\} \quad (4)$$

where the min is with respect to all pulses in the sequence. In the ideal case, all pulses will have a pulse width that is an integer number of UI and the minimum pulse width will be 1 UI. However, in real systems, the pulse widths may shrink (i.e., the pulses may narrow). The amount of shrinkage can be characterized by $$\text{pulse width shrinkage} = \quad (5)$$
$$\text{ideal minimum pulse width} - \text{actual minimum pulse width} =$$
$$1 UI - \text{minimum pulse width of Eqn. (4)}$$

More generally, let $$\text{pulse reduction} = \quad (6)$$
$$\text{ideal pulse width} - \text{actual pulse width} = mUI - (t_{n+1} - t_n)$$

where the pulse ideally has duration m UI. For a special case, consider the pulse reduction of 1-bit pulses, where Eqn. (6) is limited only to 1-bit pulses. Then, assuming that the minimum pulse width arises from a 1-bit pulse, it can be shown that the $$\text{pulse width shrinkage} = \max\{\text{pulse reduction}\} \quad (7)$$

where the max is taken with respect to 1-bit pulses in the sequence.

Other metrics for pulse narrowing can also be used. For example, a metric based on the average 1-bit pulse reduction might be used. Alternately, a metric that accounts for each pulses's contribution to a SNR or bit error rate (BER) due to narrowing of that pulse may be used. The metrics may also consider narrowing of multi-bit pulses in addition to just 1-bit pulses.

In FIG. 1, the pre-converter electrical channel 114 is designed to minimize the pulse width shrinkage of Eqn. (5), which is equivalent to maximizing the minimum pulse width of Eqn. (4). For reasons that will be apparent below, the pre-converter electrical channel 114 that reduces pulse narrowing compared to the DDJ-minimizing case, will sometimes be referred to as an overcompensated pre-converter electrical channel. The corresponding pre-converter signal will be referred to as an overcompensated pre-converter signal. In FIG. 1, the overcompensation is applied by the pre-emphasis filter 115.

Figure 2:
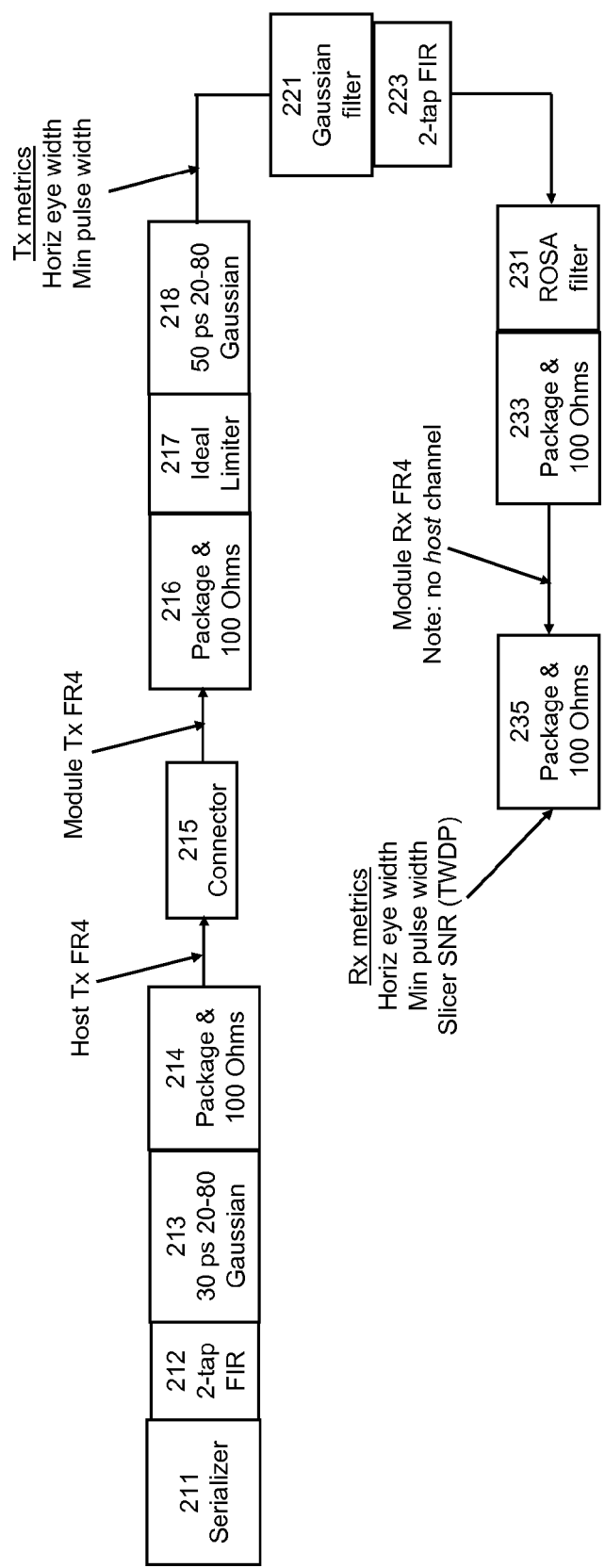
FIG. 2 is a block diagram that shows an example configuration used to demonstrate various aspects of the invention.

FIG. 2 is a block diagram that shows an example configuration used to demonstrate this approach. It includes the following in order from transmitter to receiver. Serializer 211 is an NRZ data sequence generator, modeled to generate a sequence of binary ones and zeros as positive and negative voltages, respectively. The pulse shapes are assumed to be ideally rectangular. The data rate and data sequence are appropriate to the application, such as 8.5 GBd Fibre Channel or 10.3125 GBd Ethernet.

A 2-tap FIR pre-emphasis circuit 212 is used ahead of an SFP+ transmitter electrical channel. The main tap has zero delay and a gain of unity plus g plus g, where g is variable. The post-cursor tap is modeled as having a variable gain −g and a delay of one unit interval from the main tap. That is, the 2-tap FIR filter 212 has response (1+g, −g) with a delay of 1 UI. It should be understood that the filter response may be equivalently scaled by an arbitrary constant. For example, a filter with response (1, −a) where a=g/(1+g), is equivalent to a filter with a response (1+g, −g).

Rise and fall time filter 213 (and also 218 later) are modeled as having a Gaussian impulse response. The output rise and fall times, given a step response at the input, are 30 picoseconds for filter 213, defined as being the time between the 20% and 80% output transition levels. They are 50 picoseconds for filter 218. Filter 213 models the rise/fall times of an electrical signal, whereas filter 218 models the rise/fall times of an optical signal.

Block 214 (and also 233 later) models the output of an integrated circuit, with respect to source impedance and parasitic reactances and losses for practical packages and attachment to printed circuit boards. The source impedances in blocks 214 and 233 are both modeled with 100 ohms. Connector 215 allows a separate optical module to be plugged and unplugged into/from a host system receptacle, such as would be used for a SFP+ system. SFP+ is a small serial pluggable module system intended for operation in excess of 10 Gb/s. Specification details may be found at www.sffcommittee.com, primarily under document numbers SFF-8431 and SFF-8432, which are incorporated herein by reference. The connector's parasitic reactances and losses including attachment to a printed circuit board are modeled in block 215. Block 216 (and also 235 later) models the input of an integrated circuit, with respect to load impedance and parasitic reactances and losses for practical packages and attachment to printed circuit boards. The load impedances in blocks 216 and 235 are both modeled with 100 Ohms. The notation "FR4" is used to model printed circuit boards. These are modeled with analytic functions that include frequency dependent loss (magnitude and phase) terms for skin effect and dielectric loss, as well as resistive loss and nominal impedance.

Limiter 217 is modeled as an ideal limiter. Whenever the input signal is below zero, the output is set to a fixed low value. Whenever the input signal is above (or equal to) zero, the output is set to a fixed high value. The difference between the fixed low and high values is the optical modulation amplitude (OMA) of the output of the optical transmitting device.

The optical fiber is modeled as a 2-tap FIR 223 and Gaussian filter 221. The FIR filter 223 is a simple model for an optical fiber and has two taps. Both taps have variable gain, but the sum of their gains equals unity, and neither gain is negative. The second tap is delayed by 0.5 UI from the first tap in this model. If the magnitude of the first tap is smaller than that of the second, the response is known as pre-cursor. If the magnitude of the first tap is larger than that of the second, the response is known as post-cursor. When the two taps have equal amplitude, the response is known as symmetrical. Another option for a symmetrical response is for one of the taps to have a value equal to zero, and where the impulse response of the Gaussian filter is symmetrical (even function). Gaussian filter 221 works in conjunction with FIR filter 223 to smooth and refine the overall impulse responses of the pre-cursor, post-cursor, and symmetrical fiber responses. In this example, the filter has a Gaussian impulse response with a −3 dB (0.707) bandwidth of 7.6, 7.6, and 5 GHz respectively.

In the following simulations, three different types of fibers are modeled:

Symmetric: (1.00, 0.00) FIR filter and 5 GHz Gaussian filter

Pre-cursor: (0.33, 0.67) FIR filter and 7.6 GHz Gaussian filter

Post-cursor: (0.67, 0.33) FIR filter and 7.6 GHz Gaussian filter

All three cases have a PIE-D of approximately 1.86 dB. PIE-D is an equalizability optical penalty metric for a linear pulse shape. The metric compares the signal to noise ratio of the pulse shape with an ideal decision feedback equalizer (FFE and DFE) to that of an ideal rectangular pulse shape of the same amplitude and its corresponding matched filter bound receiver.

The receiver is modeled by ROSA filter 231 through Package 235. The ROSA filter 231 converts the optical signal back to an electrical signal and applies a filter. The filter response is modeled as a 4th-order Bessel-Thomson low-pass filter with a −3 dB (0.707) bandwidth of 75% of the serial data rate. In the case of 8.5 GBd Fibre Channel, the bandwidth is 6.375 GHz. Elements 233 and 235 were described above.

In the following simulations, three different types of receivers are modeled:

Limiter: only a simple limiter and no equalizer (1 main feedforward tap and 0 feedback taps)

DFE: decision feedback equalizer (1 main feedforward tap and 2 feedback taps)

DFE/FFE: decision feedback equalizer and feedforward equalizer (3 feedforward taps and 2 feedback taps)

In the following simulations, the value of g in the pre-emphasis filter 212 is varied from −0.25 to 0.50. As will be seen, g is a good proxy for illustrating the effect of pulse narrowing. The 2-tap pre-emphasis circuit 212 is used as a simple example to illustrate principles of pulse narrowing. Other types of compensation/pre-emphasis can also be used. For comparison purposes, the value of g that maximizes the data dependent horizontal eye width (i.e., that minimizes DDJ) defines "conventional" or "DDJ-minimizing" compensation. For the 2-tap FIR filter, overcompensation is defined as when g is greater than the "conventional" value and undercompensation is defined as when g is less than this value.

In the following simulations, the value of g is varied for different types of fibers and different types of receivers, as described above. The resulting minimum pulse width of Eqn. (4) and horizontal eye width of Eqn. (2) are observed both at the transmitter and at the receiver. Note that pulse width shrinkage is the complement of minimum pulse width (Eqn. (5)), and DDJ is the complement of horizontal eye width (Eqn. (2)). The SNR at the receiver slicer is also observed. The transmitter metrics are measured at the point labeled "Tx metrics." For the assumptions of this model, the Tx metrics where measured are approximately the same as if measured at the laser diode driver input termination. The receiver metrics are measured at the point labeled "Rx metrics." Note that all metrics are data dependent.

FIGS. 3-7 show the results of the simulation. FIG. 3A plots the minimum pulse width (in units of UI) as a function of g for four separate cases. Curves 310A shows the graph for the minimum pulse width measured at the transmitter. Curves 320A (three curves) show the graphs for the minimum pulse width measured at the receiver. The three curves 320A correspond to the cases of symmetric fiber, pre-cursor fiber and post-cursor fiber, respectively.

Figure 3A:
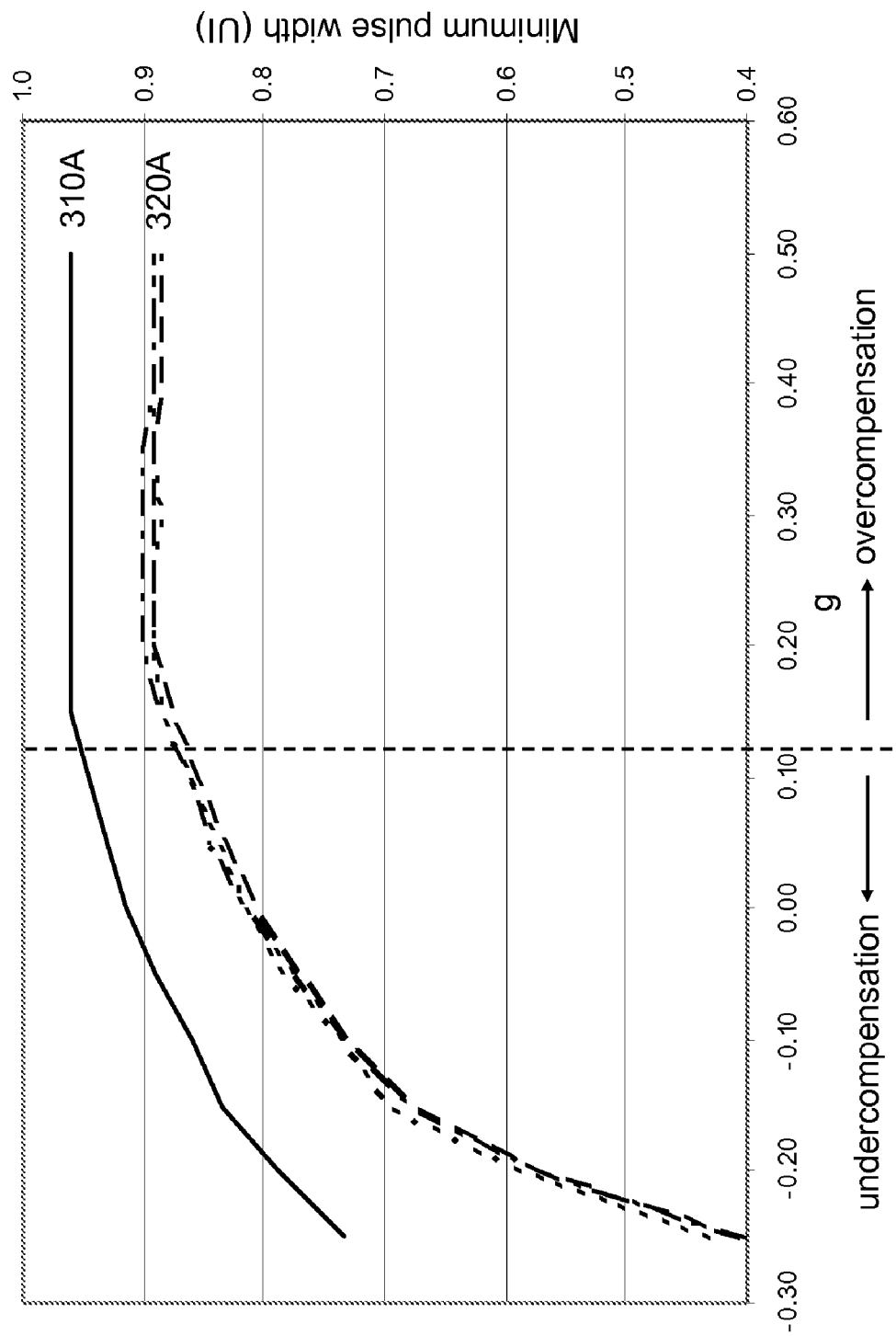
FIG. 3A is a graph that plots the minimum pulse width as a function of g.

The minimum pulse width curves in FIG. 3A tend to have a shoulder at around g=0.15. The curves generally reach a maximum value at the shoulder (for both transmitter metrics 310A and receiver metrics 320A and for all types of fiber) and then remain relatively flat for higher values of g. That is, the minimum pulse width is relatively insensitive to variations in g above the shoulder (which occurs at 0.15 in this example). The dashed line shows the value of g that minimizes the conventional metric DDJ, which is approximately 0.1. Overcompensation occurs for values of g above the dashed line and undercompensation for values below the dashed line. Note that overcompensation is desirable both to maximize the minimum pulse width and also to allow some margin against the sharp fall-off in minimum pulse width that occurs with undercompensation.

Figure 3B:
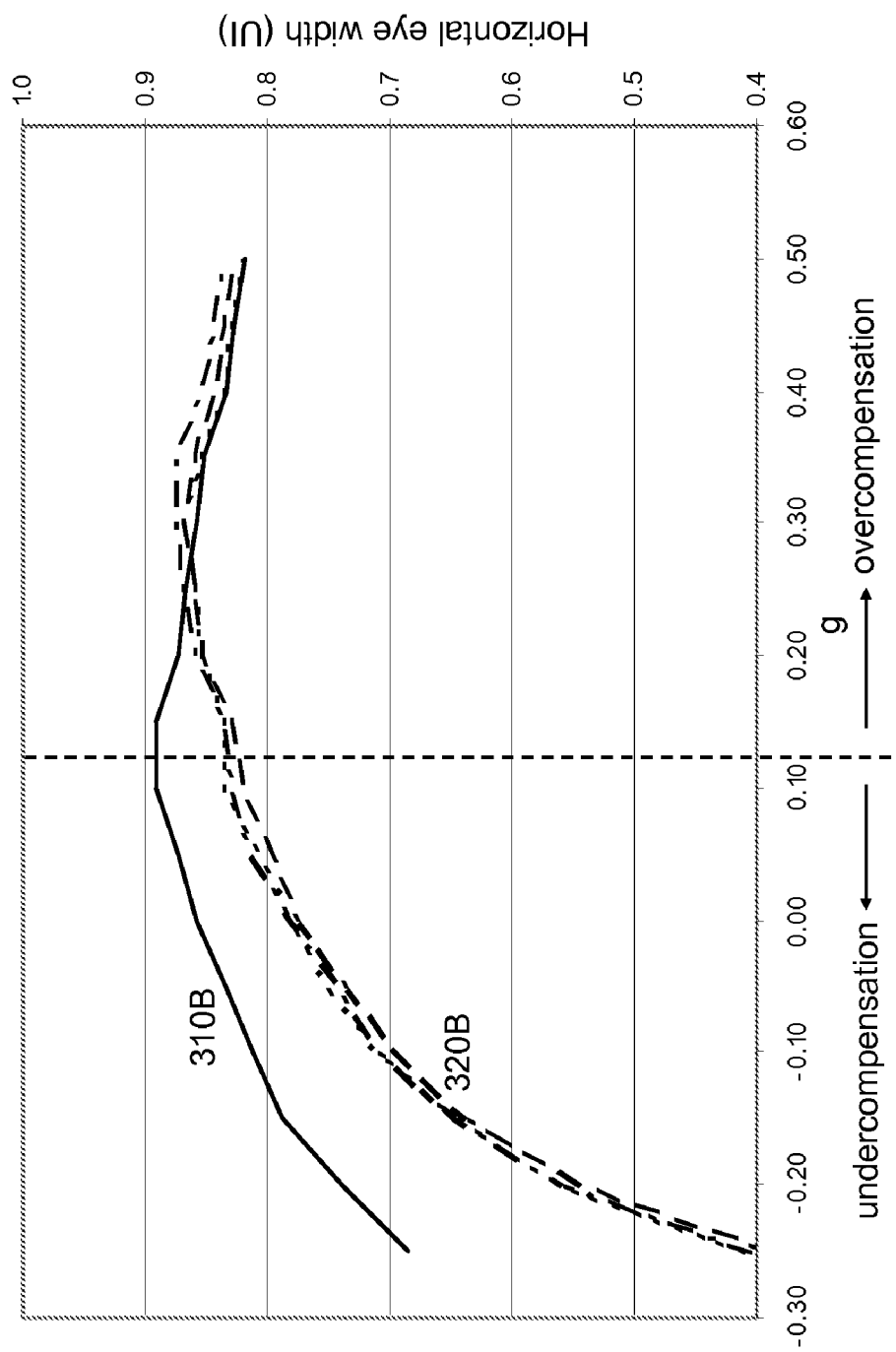
FIG. 3B is a graph that plots the horizontal eye width as a function of g.

For comparison, FIG. 3B plots the horizontal eye width as a function of g. Curve 310B is measured at the transmitter and curves 320B is measured at the receiver, again for three different fiber types. The horizontal eye width curves in FIG. 3B tend to reach a maximum at some value of g and then decrease (i.e., increased DDJ) for greater values of g. This value is approximately 0.1 for the transmitter metric 310B. The dashed line is located at the peak value of horizontal eye width on curve 310B.

Figure 4:
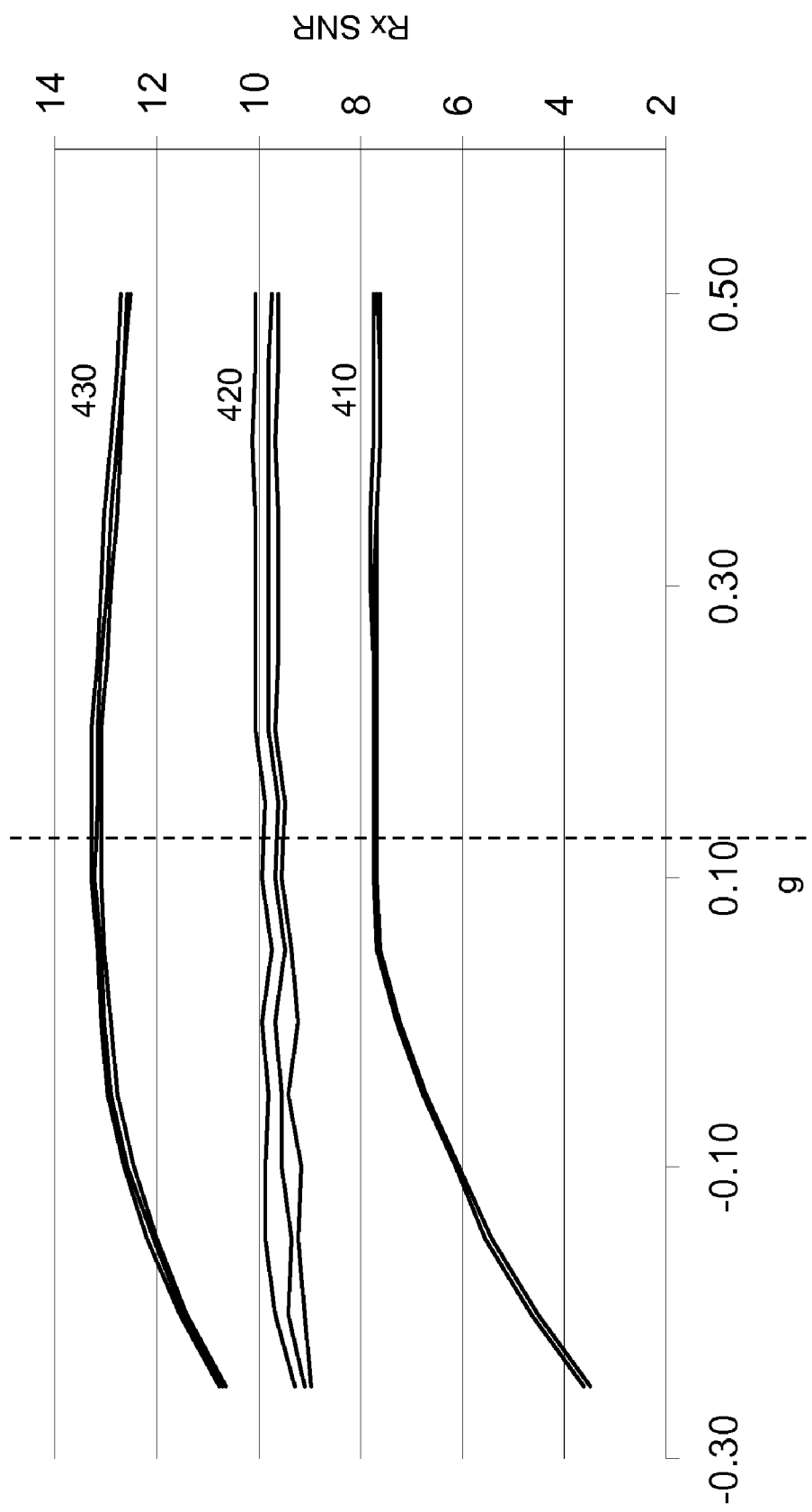
FIG. 4 is a graph that plots the receiver SNR as a function of g.

FIG. 4 plots the receiver SNR (i.e., the SNR at the receiver slicer) as a function of g for nine separate cases consisting of all possible combinations of the three types of fiber (symmetric, pre-cursor and post-cursor) and the three types of receivers (Limiter, DFE and DFE/FFE). The fiber type does not have a significant effect on these curves. Curves 410 are the three types of fiber with a Limiter receiver; curves 420 are the three fibers with a DFE receiver; and curves 430 are the three fibers with a DFE/FFE receiver. The dashed line again marks the DDJ-minimizing value of g.

The FFE/DFE receiver tends to have better performance than the DFE receiver, which is better than the straight limiter receiver. For the FFE/DFE receiver, the receiver SNR 430 tends to peak at a value of g which roughly corresponds to the DDJ-minimizing value (i.e., g of approximately 0.1). Receiver SNR tends to fall off gently as g is increased into the overcompensation region, especially when compared to the fall off in the undercompensation region.

For the DFE and limiter receivers, the receiver SNR curves 410 and 420 tend to have a shoulder at approximately the same location as the minimum pulse width curves of FIG. 3B. The curves are relatively flat as g is increased into the overcompensation region.

Figure 5:
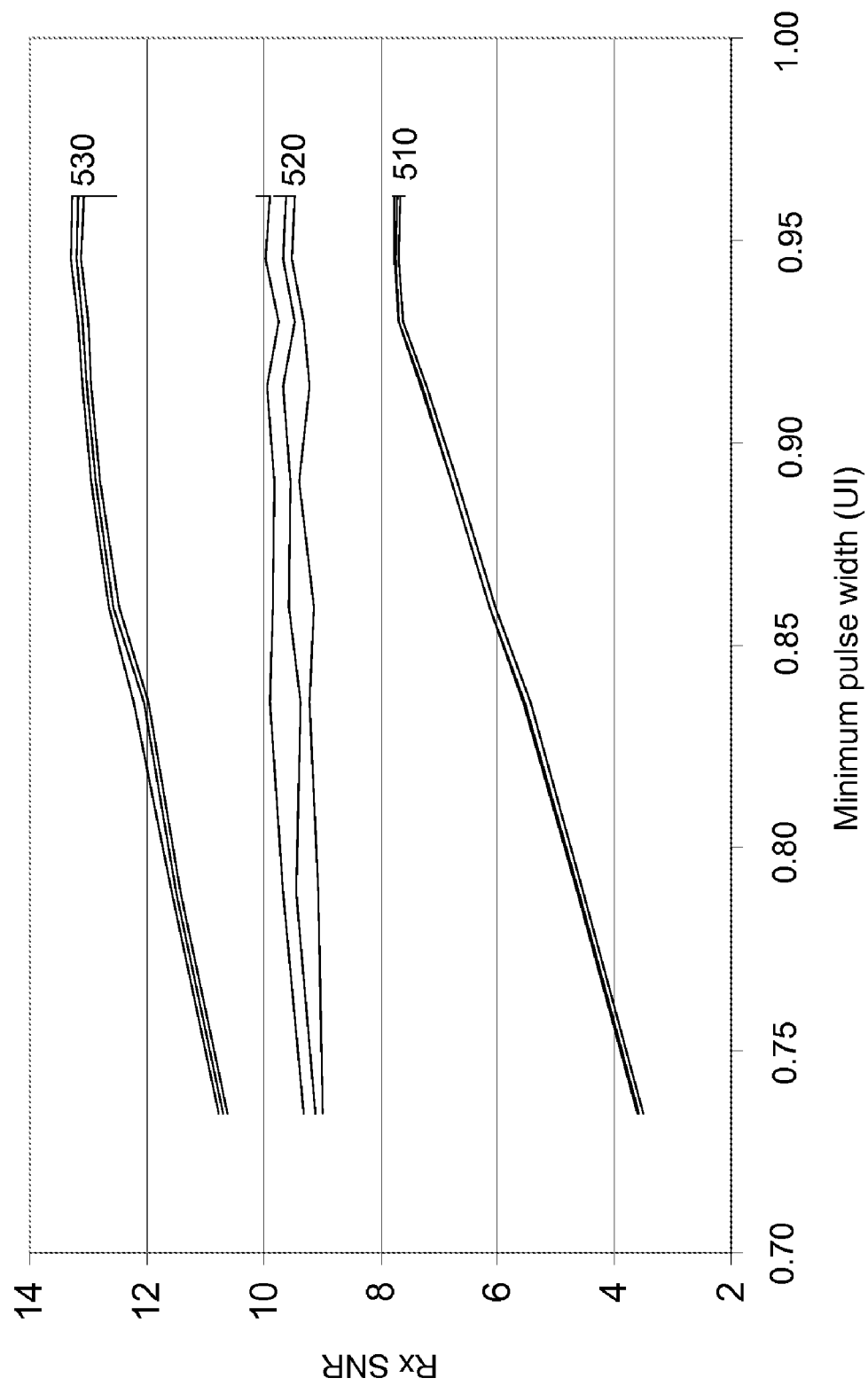
FIG. 5 are graphs that plot the receiver SNR as a function of the minimum pulse width.
Figure 6A:
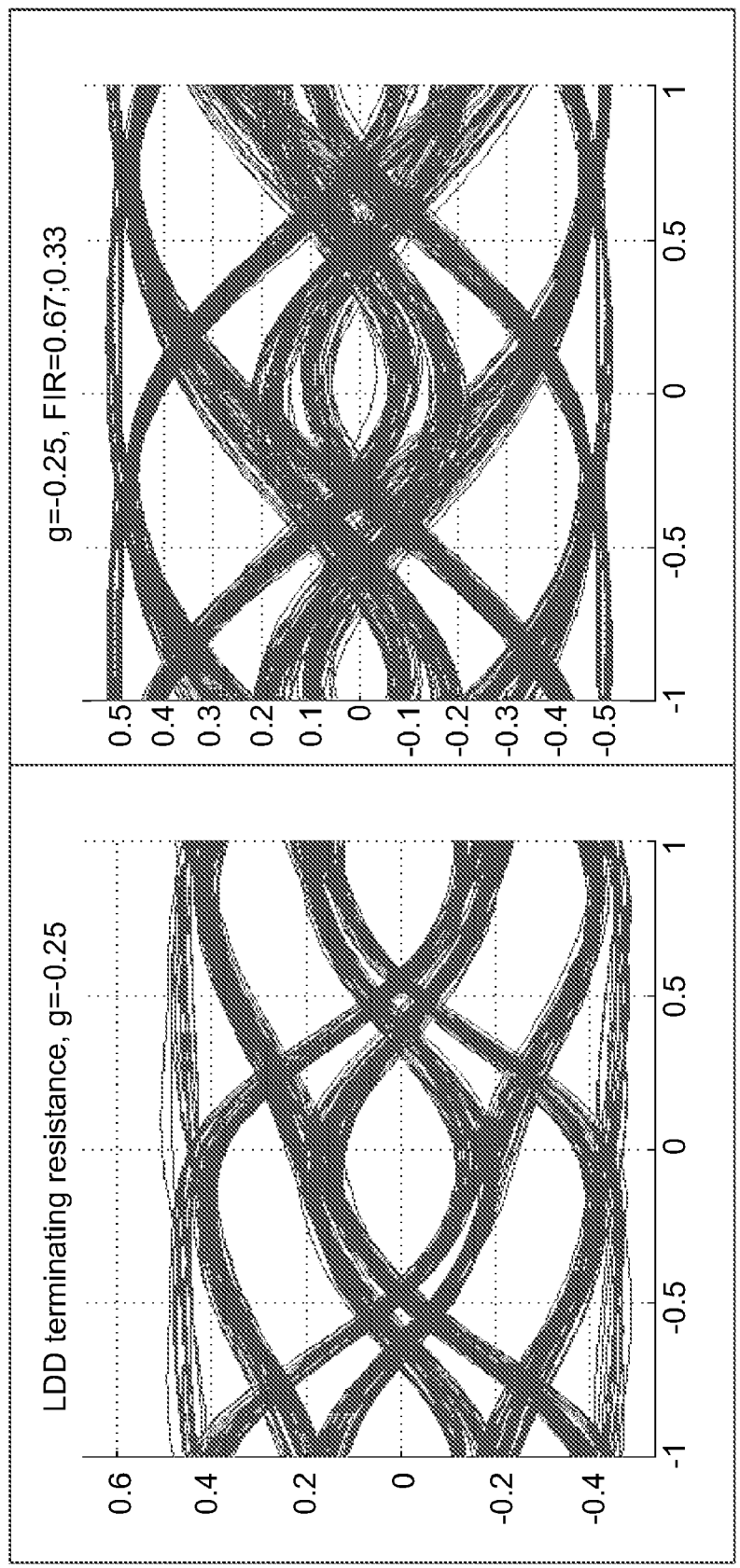
FIGS. 6A-6D show pairs of eye diagrams for various values of g.
Figure 6B:
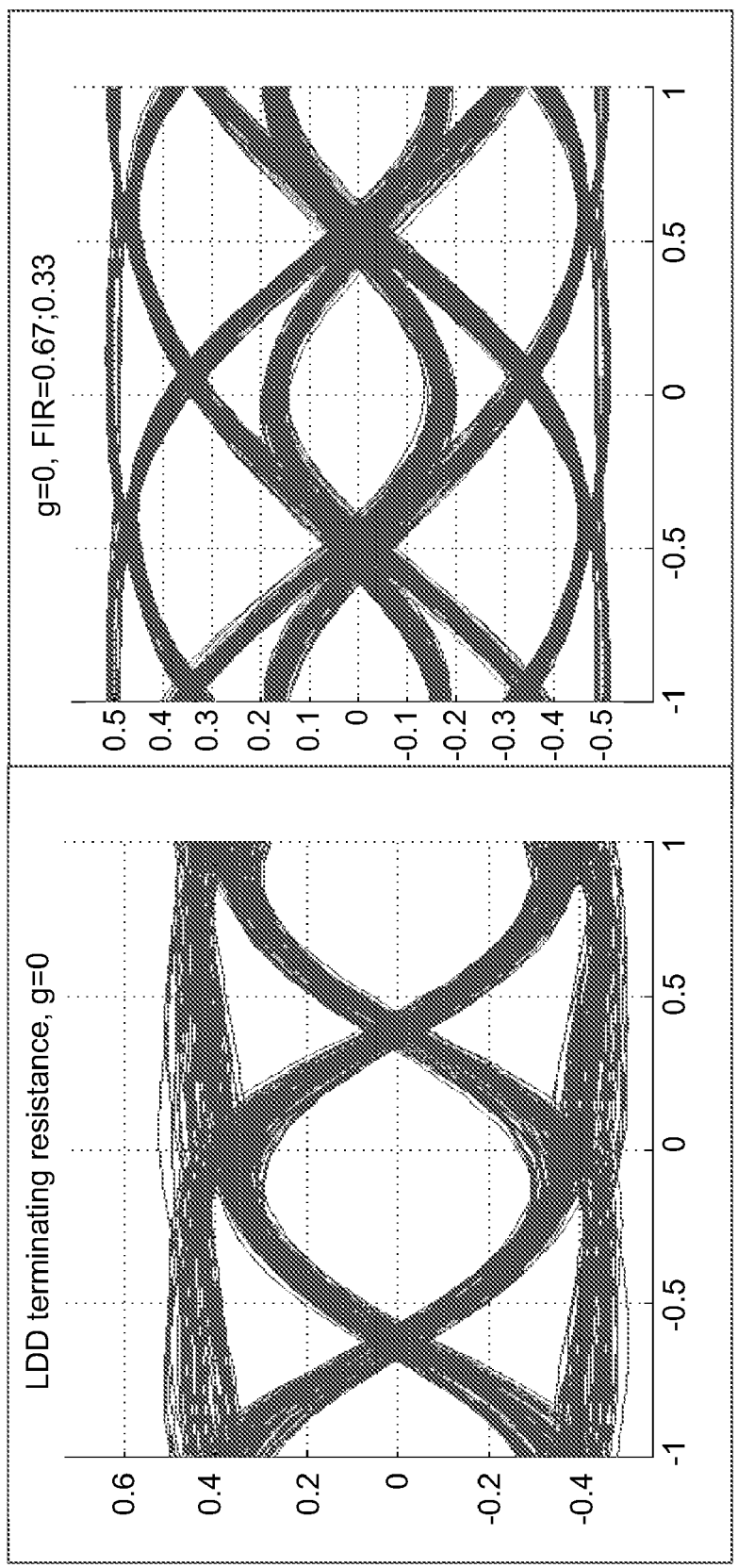
Figure 6C:
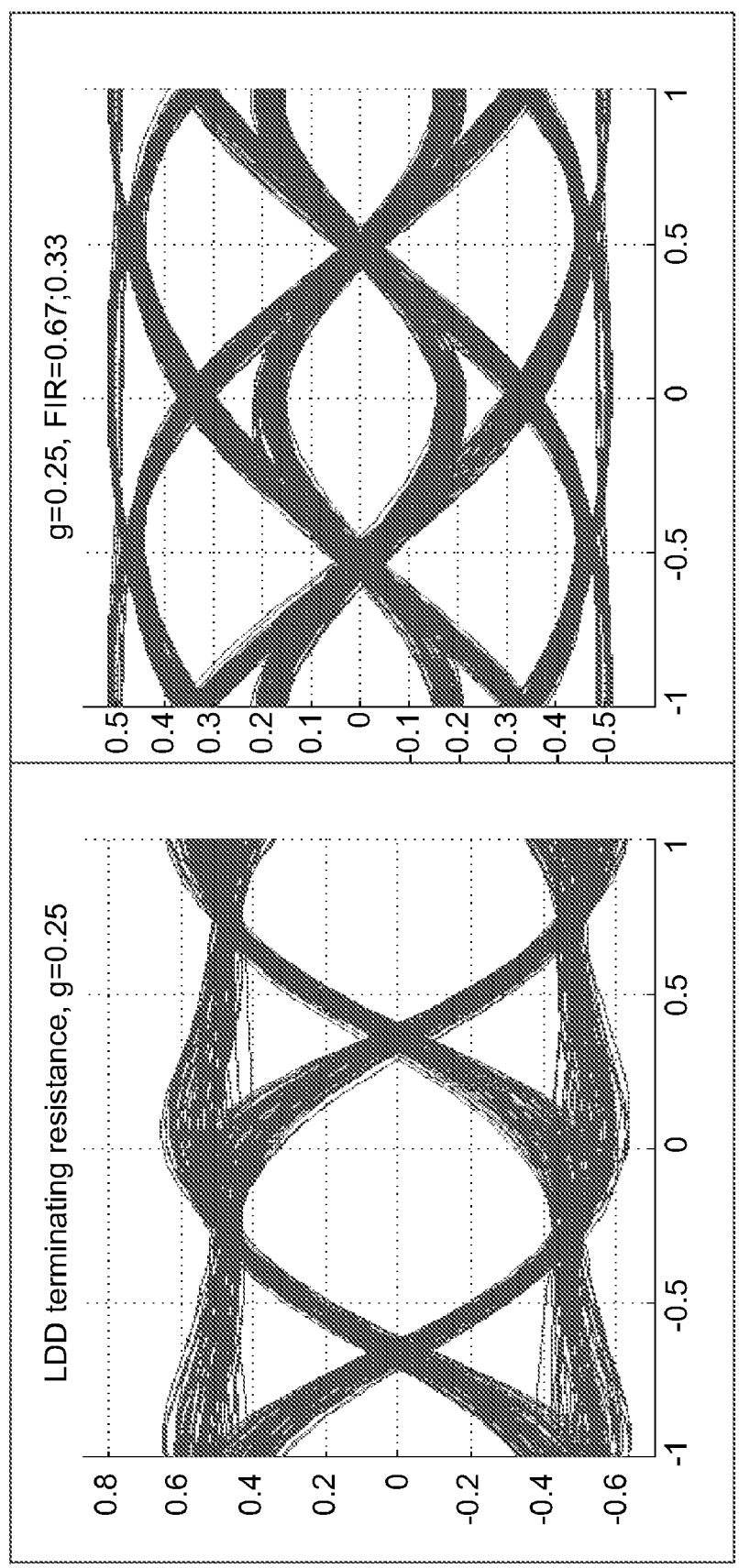
Figure 6D:
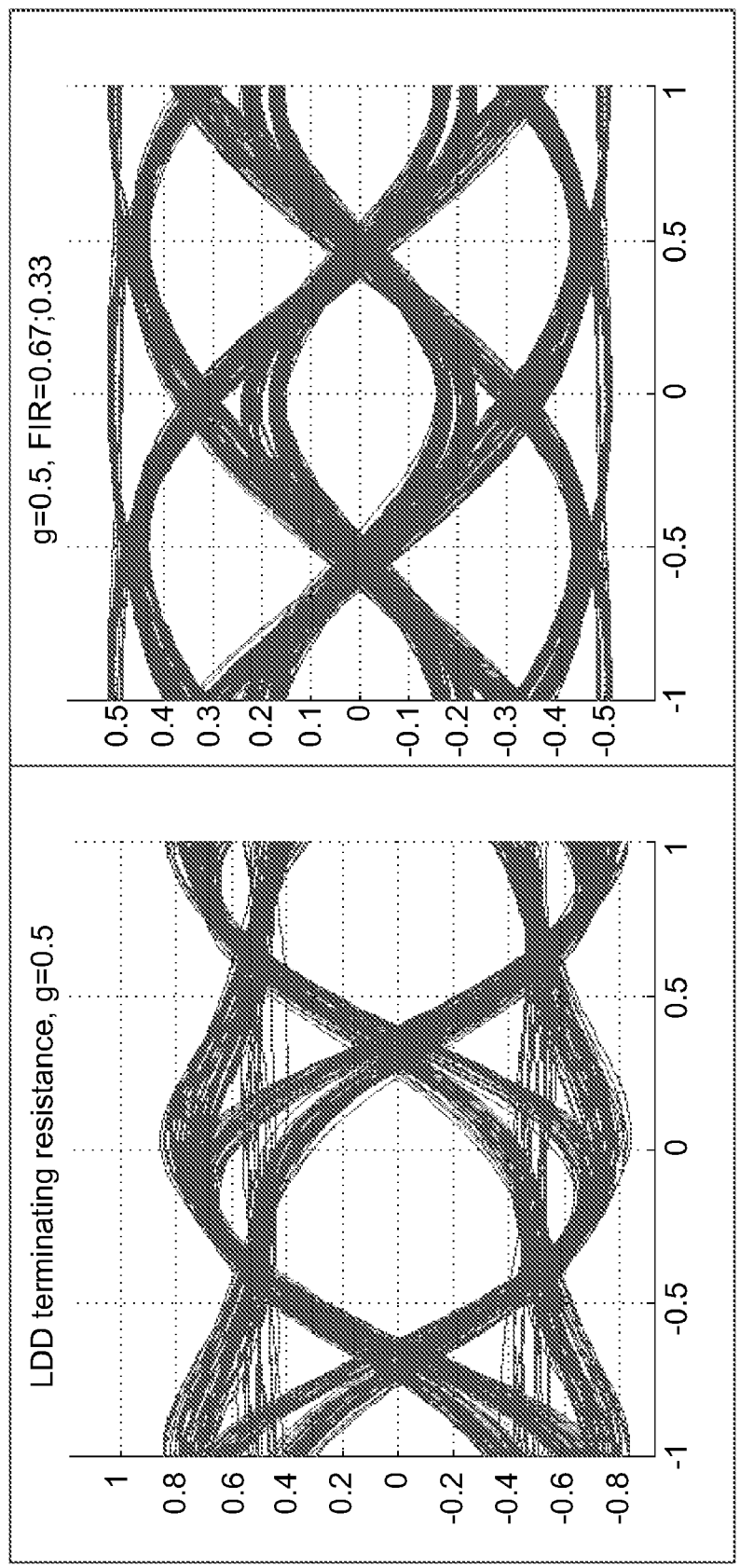

FIG. 5 combines the nine curves shown in FIG. 4 with curves 310A of FIG. 3A, plotting receiver SNR as a function of the transmitter minimum pulse width. As in FIG. 4, the curves in FIG. 5 have only a weak dependence on fiber type. Curves 510 are the three types of fiber with a Limiter receiver; curves 520 are the three fibers with a DFE receiver; and curves 530 are the three fibers with a DFE/FFE receiver. The receiver SNR tends to have a linear and monotonic dependency on minimum pulse width, especially for the DFE and Limiter cases when compared to the equivalent curves for horizontal eye width (not shown in FIG. 5). Note that since pulse width shrinkage is complementary to minimum pulse width, this means that the receiver SNR will also have an approximately linear and monotonic dependency on pulse width shrinkage.

FIGS. 6A-6D show pairs of eye diagrams for various values of g. The left-hand eye diagram in each pair is taken after the "Package and 100 Ohms" termination 216 of FIG. 2, which is also the input to the Ideal Limiter 217. The right-hand eye diagram is taken at the receiver IC termination, at the output of block 235. FIGS. 6A-6D correspond to values of g=−0.25 (undercompensated), g=0 (slightly undercompensated), g=0.25 (slightly overcompensated) and g=0.50 (overcompensated). Recall that reducing pulse width shrinkage corresponds to higher values of g. These figures are based on post-cursor fiber and do not include any effects of equalization.

Since the eye diagrams in the right-hand plot of each figure do not include any effects of equalization, quality can be approximated by the height of the eye opening. The height in the center of the eye, for the limiting case at least, is approximately proportional to SNR. The eye height (and SNR) is low for g=−0.25, which also corresponds to the case with the most pulse width shrinkage. However, for the other three cases, the eye height is roughly the same and significantly larger than for g=−0.25. This is true, even though DDJ has increased in the g=0.5 case (although the pulse width shrinkage has not increased significantly). This shows the insensitivity of receiver SNR to overcompensation and the importance of pulse width shrinkage.

Thus, one possible way to implement control over pulse narrowing is by overcompensation. Begin by increasing the compensation of the pre-converter electrical channel. This will initially cause the horizontal eye opening to also increase (e.g., moving from g=−0.25 to g=0 in FIG. 6). At some point, the horizontal eye opening will cease to increase further (at g=0.10 in FIG. 6). This is the DDJ-minimizing point. Overcompensation is achieved by continuing to increase the compensation beyond this point (e.g., to g=0.25 or g=0.5 in FIG. 6). This can be beneficial because the receiver SNR is insensitive to overcompensation in certain situations. Overcompensation provides more robust tolerance to variations of components across production lots and environment.

Of course, control over pulse narrowing can also be achieved by directly monitoring the pulse narrowing. For example, compensation can be applied (e.g., g can be increased) until the pulse width shrinkage is minimized.

Stronger degrees of overcompensation can also be identified by overshoot. In FIGS. 6A-6D, the overcompensated cases exhibit more overshoot in their eye diagrams.

Figure 7:
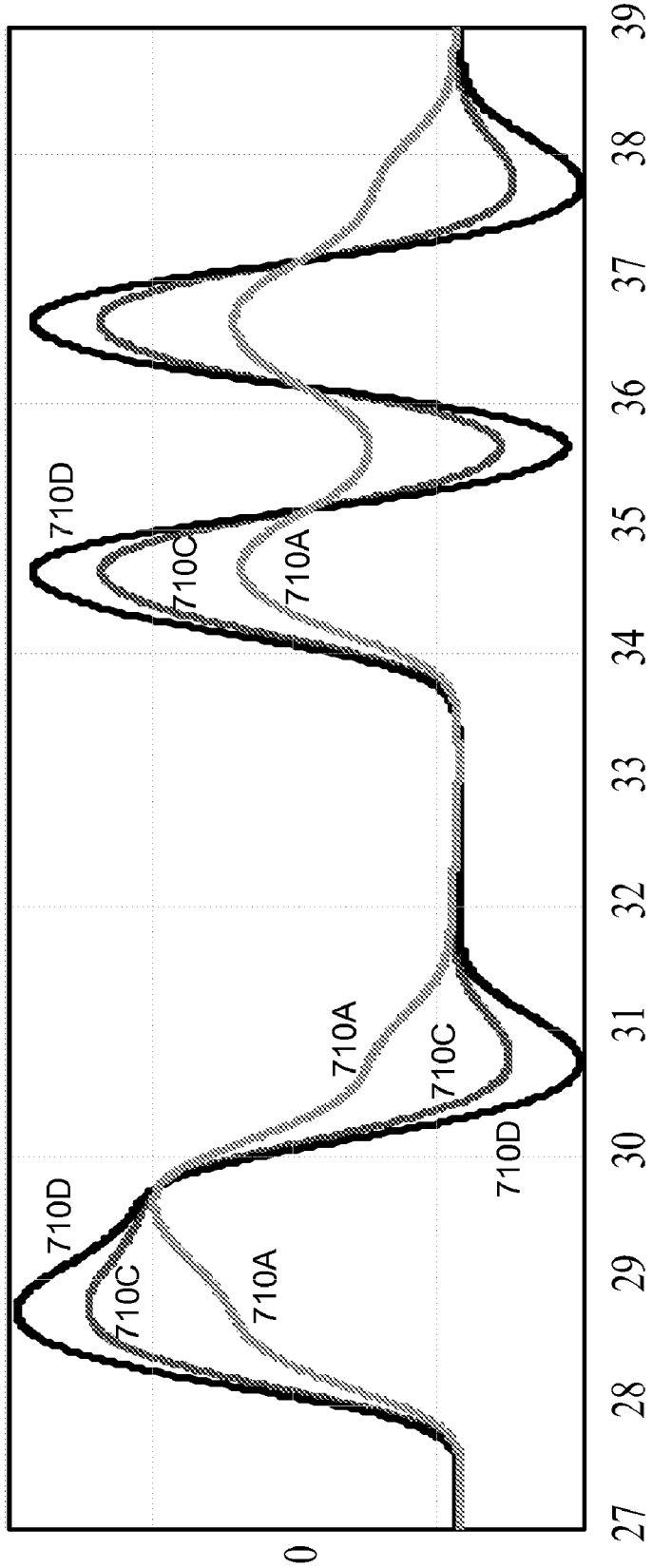
FIG. 7 shows the waveform of the pre-converter signal entering the ideal limiter.

FIG. 7 shows the waveform of the pre-converter signal entering the ideal limiter. Curve 710A corresponds to g=−0.25 (undercompensated), curve 710C to g=0.25 (slightly overcompensated) and curve 710D to g=0.5 (overcompensated). The time scale is in UIs and the limited threshold is 0. That is, values above 0 will be hard limited to "laser high" and values below 0 will be hard limited to "laser low." The output pulse between t=34 and 35 is a "1" following a series of "0"s. For the undercompensated case 710A, this pulse will be narrowed to less than 1 UI. For the overcompensated case 710D, it will be wider than the nominal 1 UI. It is typically single bit pulses that follow a long string of complementary consecutive 1's or 0's that are more susceptible to the effects of intersymbol interference and compensation, and hence, pulse narrowing. The narrowed pulse, which is essentially a higher frequency pulse than the wider one, will suffer more loss in the following dispersive optical channel and lead to reduced receiver SNR.

The examples shown above suggest that pulse narrowing is a concern. It is a good predictor of performance especially for non-FFE receivers, for example DFE-only or limiter-only receivers. This suggests that overcompensation will be especially useful in these situations. Narrow transmitted pulses are more vulnerable to dispersion of the downstream channel. Undercompensation of the transmitter should generally be avoided. The receiver SNR is quite tolerant to overcompensation.

The simulations show that for some cases time-narrowing of isolated pulses (caused by intersymbol interference ahead of the nonlinear laser diode driver) is the aspect of data dependent jitter that causes the highest penalties in a dispersive link. Accordingly, minimizing pulse width shrinkage (or other pulse narrowing metrics) at the transmitter can be important. In fact, it can be more important to receiver SNR than minimizing DDJ, especially for receivers that do not have a feed-forward equalizer (i.e., non-FFE receivers). Minimizing pulse width shrinkage can be accomplished during calibration of the pre-emphasis circuit, for example by (1) measuring the crossing-time differences in all edge pairs at the transmitter in a repeating mixed data sequence (such as PRBS) and observing the minimum value of all pairs (i.e., measuring the minimum pulse width or, equivalently, the pulse width shrinkage), (2) increasing compensation (e.g., pre-emphasis) until the minimum pulse width no longer increases (or the pulse width shrinkage no longer decreases), and (3) applying some amount of additional compensation (overcompensation) for margin against variations in channel properties. The overcompensation appears to cause little loss in receiver SNR. Depending on the receiver structure, a performance metric based on some weighted combination of pulse width shrinkage and DDJ may be the best predictor of SNR at the receiver. For example, minimizing an average of the two quantities could be a good design target, and this average could be used as a quality metric for a given transmitter.

In addition, although the figures above discuss pulse width shrinkage and pulse narrowing in the context of a receiver metric (specifically, receiver SNR), similar concepts also apply to transmitter metrics. That is, in many cases, reducing pulse narrowing is also beneficial for transmitter metrics. Some examples of transmitter metrics include TWDP from IEEE Std 802.3aq-2006 (LRM) and TDP from IEEE Std 802.3-2005. The concepts of pulse narrowing and metrics for pulse narrowing (e.g., pulse width shrinkage) can also be measured at other points, for example at the optical output of the transmitter.

Although the detailed description contains many specifics, these should not be construed as limiting the scope of the invention but merely as illustrating different examples and aspects of the invention. It should be appreciated that the scope of the invention includes other embodiments not discussed in detail above. For example, instead of OOK, optical duobinary or other formats commonly used for long-haul applications might possibly be used. In addition, the term "module" is not meant to be limited to a specific physical form. Depending on the specific application, modules can be implemented as hardware, firmware, software, and/or combinations of these. Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An optical transmitter for transmitting data over an optical fiber at a specified data rate, comprising:
   a pre-converter electrical channel that produces a pre-converter signal encoding the data, wherein the pre-converter signal has less pulse narrowing than that produced by a pre-converter electrical channel optimized to minimize data-dependent jitter and wherein the pre-converter electrical channel comprises a pre-emphasis filter that applies overcompensation to a signal received by the pre-converter electrical channel and wherein the pre-emphasis filter comprises a filter having coefficients of (1+g) and (−g) and a delay of 1 unit interval, wherein the value of g is greater than the value of g that would minimize data-dependent jitter; and
   a limiting E/O converter that receives the pre-converter signal and produces an optical signal from the pre-converter signal, where the optical signal encodes the data based on on-off keying and is suitable for transmission over the optical fiber.

2. The optical transmitter of claim 1 wherein the pulse width shrinkage for the pre-converter signal is less than that produced by a pre-converter electrical channel optimized to minimize data-dependent jitter.

3. The optical transmitter of claim 1 wherein, for a transition from a "0" bit to a "1" bit or vice versa, the pre-converter signal exhibits more overshoot than that of a pre-converter electrical channel optimized to minimize data-dependent jitter.

4. The optical transmitter of claim 1 wherein the limiting E/O converter comprises:
   a laser driver that receives and limits the pre-converter signal to produce a laser driver signal; and
   a laser source coupled to the laser driver and driven by the limited laser driver signal.

5. The optical transmitter of claim 1 wherein the transmitter transmits data over the optical fiber to a non-FFE receiver.

6. The optical transmitter of claim 1 wherein the transmitter transmits data over the optical fiber to a limiter-only receiver.

7. The optical transmitter of claim 1 wherein the data rate is approximately 10G.

8. The optical transmitter of claim 1 wherein the transmitter complies with an X2, XFP or SFP+ form factor.

9. An optical transmitter for transmitting data over an optical fiber at a specified data rate, comprising:
   a pre-converter electrical channel that produces a pre-converter signal encoding the data, the pre-converter signal having a pulse width shrinkage of not more than 0.1 unit intervals (UI), and wherein the pre-converter electrical channel comprises a pre-emphasis filter that applies overcompensation to a signal received by the pre-converter electrical channel and wherein the pre-emphasis filter comprises a filter having coefficients of (1+g) and (−g) and a delay of 1 unit interval; and
   a limiting E/O converter that receives the pre-converter signal and produces an optical signal from the pre-converter signal, where the optical signal encodes the data based on on-off keying and is suitable for transmission over the optical fiber.

10. The optical transmitter of claim 9 wherein the pre-converter signal has a pulse width shrinkage of not more than 0.05 UI.

11. The optical transmitter of claim 9 wherein the pre-converter signal has a pulse width shrinkage of not more than 0.02 UI.

12. The optical transmitter of claim 9 wherein the pre-converter signal has a pulse width shrinkage of not more than 0.01 UI.

13. An optical transmitter for transmitting data over an optical fiber at a specified data rate, comprising:
   a pre-converter electrical channel that produces a pre-converter signal encoding the data, the pre-converter signal having an overshoot of not less than 10% upon a transition from a "0" bit to a "1" bit or vice versa, and wherein the pre-converter electrical channel comprises a pre-emphasis filter that applies overcompensation to a signal received by the pre-converter electrical channel and wherein the pre-emphasis filter comprises a filter having coefficients of (1+g) and (−g) and a delay of 1 unit interval; and
   a limiting E/O converter that receives the pre-converter signal and produces an optical signal from the pre-converter signal, where the optical signal encodes the data based on on-off keying and is suitable for transmission over the optical fiber.

14. The optical transmitter of claim 13 wherein the pre-converter signal has an overshoot of not less than 5% upon a transition from a "0" bit to a "1" bit or vice versa.

15. The optical transmitter of claim 13 wherein the pre-converter signal has an overshoot of not less than 2% upon a transition from a "0" bit to a "1" bit or vice versa.

16. A method for transmitting data over an optical fiber at a specified data rate, the method comprising:
   receiving the data;
   applying a pre-emphasis filter to the data that applies overcompensation to the data to produce filtered data, wherein the pre-emphasis filter has coefficients of 1+g) and (−g) and a delay of 1 unit interval, wherein the value of g is greater than the value of g that would minimize data-dependent jitter;
   producing a pre-converter signal encoding the filtered data, wherein the pre-converter signal has less pulse narrowing than that produced by a pre-converter electrical channel optimized to minimize data-dependent jitter; and
   producing an optical signal from the pre-converter signal, where the optical signal encodes the pre-converter signal based on on-off keying and is suitable for transmission over the optical fiber and the step of producing the optical signal includes limiting the pre-converter signal.

17. A method for testing optical transmitters that include a pre-converter electrical channel coupled to a limiting E/O converter, the method comprising:
   applying a repeating mixed data sequence to the pre-converter electrical channel; and
   measuring a crossing time for each edge of each pulse in the pre-converter signal;
   calculating a minimum pulse width for all pulses based on the measured crossing time differences; and
   calculating a pulse width shrinkage based on the minimum pulse width;
   determining a pulse narrowing metric of the pre-converter signal produced by the pre-converter electrical channel in response to the repeating data sequence, the pulse narrowing metric based on the calculated pulse width shrinkage; and
   characterizing the optical transmitter at least in part based on the pulse narrowing metric.

18. The method of claim 17 wherein the optical transmitter produces an OOK optical signal.

19. The method of claim 17 wherein the step of characterizing the optical transmitter comprises: failing a component in the optical transmitter if the pulse narrowing metric does not meet a pre-specified requirement.

20. The method of claim 19 wherein the pulse narrowing metric is a pulse width shrinkage, and the step of characterizing the optical transmitter comprises failing a component in the optical transmitter if the pulse width shrinkage is more than a pre-specified maximum allowable amount.

21. The method of claim 19 wherein the pulse narrowing metric is a combination of pulse width shrinkage and data-dependent jitter, and the step of characterizing the optical transmitter comprises failing a component in the optical transmitter if the pulse narrowing metric is more than a pre-specified maximum allowable amount.

22. The method of claim 19 wherein the pulse narrowing metric is an average of pulse width shrinkage and data-dependent jitter, and the step of characterizing the optical transmitter comprises failing a component in the optical transmitter if the average is more than a pre-specified maximum allowable amount.

23. The method of claim 19 wherein the step of failing a component in the transmitter comprises failing a component that contains at least a portion of the pre-converter electrical channel.

24. An optical transmitter for transmitting data over an optical fiber at a specified data rate, comprising:
   a pre-converter electrical channel that produces a pre-converter signal encoding the data, the pre-converter signal characterized by a pulse narrowing metric that meets a pre-specified requirement and wherein the pre-converter electrical channel comprises a pre-emphasis filter that applies overcompensation to a signal received by the pre-converter electrical channel and wherein the pre-emphasis filter comprises a filter having coefficients of (1+g) and (−g) and a delay of 1 unit interval; and
   a limiting E/O converter that receives the pre-converter signal and produces an optical signal from the pre-converter signal, where the optical signal encodes the data and is suitable for transmission over the optical fiber.

25. The optical transmitter of claim 24 wherein the optical signal encodes the data based on on-off keying.

26. The optical transmitter of claim 24 wherein the pre-converter signal is characterized by a pulse width shrinkage that is not more than a pre-specified maximum allowable amount.

27. The optical transmitter of claim 24 wherein the pre-converter signal is characterized by a pulse narrowing metric that is a combination of pulse width shrinkage and data-dependent jitter and the pulse narrowing metric is not more than a pre-specified maximum allowable amount.

28. The optical transmitter of claim 24 wherein the pre-converter signal is characterized by an average of pulse width shrinkage and data-dependent jitter and the average is not more than a pre-specified maximum allowable amount.

* * * * *